July 24, 1923.
K. PEARSON
ANIMAL TRAP
Filed March 3, 1922
1,463,091
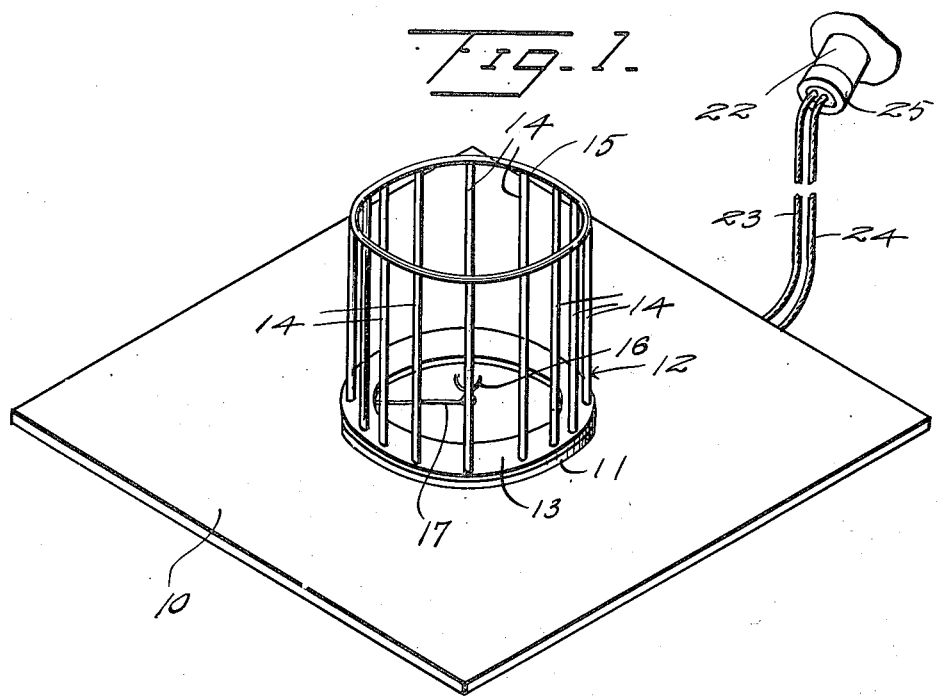
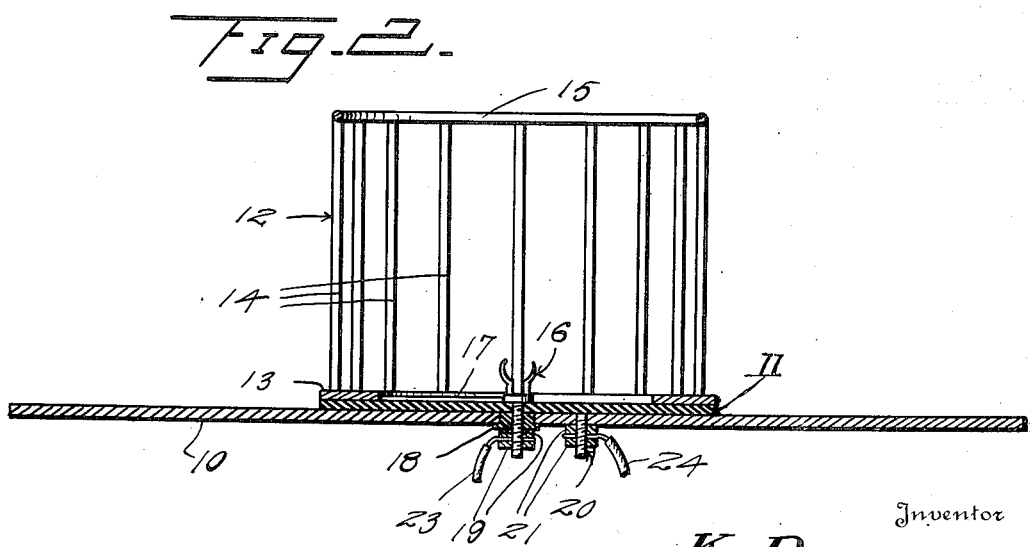
Inventor
K. Pearson Patented July 24, 1923.

1,463,091

UNITED STATES PATENT OFFICE

KENT PEARSON, OF MARION, IOWA.

ANIMAL TRAP.

Application filed March 3, 1922. Serial No. 540,712.

*To all whom it may concern:*

Be it known that I, KENT PEARSON, a citizen of the United States, residing at Marion, in the county of Linn and State of Iowa, have invented certain new and useful Improvements in an Animal Trap; and I do hereby declare the following to be a full, clear, and exact description of the invention, such as will enable others skilled in the art to which it appertains to make and use the same.

This invention relates to a trap.

One important object is to provide a novel means whereby animals, particularly rodents, may be electrocuted.

Further objects are to provide a trap having the conducting parts in an open circuit to avoid heating, the blowing of fuse plugs and unnecessary use of electric current; to provide a conducting cage within which the bait is inaccessibly disposed; to provide one in which a conducting base plate cooperates with the conducting cage to be bridged by an animal in an endeavor to reach the bait; and to provide a construction which is readily attachable to ordinary electric light sockets.

Additional objects and advantages will become apparent from a consideration of the description taken in connection with accompanying drawings illustrating one practical embodiment.

In said drawings:—

Figure 1 is a perspective view of the trap showing the same electrically connected with a lighting fixture; and Figure 2 is a central vertical sectional view.

Like reference characters designate like or similar parts in both views.

In reducing the invention to practice, a base plate is provided as at 10 which may be square as shown or of any other shape desired and which is of copper, tin or other conducting material to form an electrode. Superposed on the base plate 10 is a disc of insulating material at 11 upon which a cage generally designated 12 is fastened in any suitable manner which is also an electrode. The cage 12 consists of a conductor ring 13 serving as its base, from which a plurality of rods 14 rise, forming a grating, and preferably relatively close together so that the spaces between them are insufficient for passage of rodents therethrough. The rods 14 may be connected and reinforced by a ring at 15. The rods 14 and ring 15 are of suitable conducting material.

Disposed substantially centrally of the base plate 10 and within the cage is a hook or bait holder 16. It will be noted that the cage is open at its top so that bait may be applied to or removed from the hook or holder 16. Holder 16 is of conducting material and extends through the insulating disc 11 and base plate 10, being insulated from the latter. A conductor 17 leads from the hook 16 to the ring 13, resting on and being insulated from the base plate by means of the disc 11.

The hook 16 is insulated as at 18 from the base plate 10 and screw threaded thereon are a plurality of nuts at 19 which convert it into a binding post. At 20, a binding post is provided on the plate 10, having nuts 21 screw threaded thereto.

The apparatus may be connected in any electric circuit desired, for instance an ordinary lighting socket as at 22. To this end, conductors 23 and 24 are respectively connected to the binding posts at 16 and 20, by means of the nuts 19 and 21. Conductors 23 and 24 are connected to a detachable plug at 25 adapted to enter the socket 22 or to be connected to any other suitable source of electric current. When connected in the lamp socket 22, it will be realized that the current passing through the fixture continues through the conductors 23 and 24 to the trap. In use, with the hook 16 baited, an animal attracted by the bait in an endeavor to reach the same treads upon the base plate 10 and as well engages the ring 13 or bars 14, whereby its body bridges and closes the electric circuit resulting in its electrocution.

As merely one practical embodiment has been illustrated and described, it is to be understood that changes in the details may be resorted to provided they fall within the spirit and scope of the invention.

I claim as my invention:

1. A trap having a base electrode, an insulating disc thereon, a bait holder insulated from said electrode and extending through said disc, an electrode on said disc, and a conductor from said bait holder to the second electrode resting on said disc, 2. A trap having a base electrode, an insulating disc on said electrode, a conductor ring on said disc, a bait holder insulated from the first mentioned electrode extending therethrough and above said disc, means to render said bait holder a binding post, conductor bars rising from said second mentioned electrode, and a conductor connecting said bars above said second mentioned electrode.

In testimony whereof I affix my signature in presence of two witnesses.

KENT PEARSON.

Witnesses:
G. W. TODD,
C. C. MILLER.